United States Patent [19]

Ernecke et al.

[11] Patent Number: 5,384,439
[45] Date of Patent: Jan. 24, 1995

[54] ADAPTIVE DIGITAL VELOCITY CONTROL LOOP FOR A HIGH PERFORMANCE ELEVATOR DOOR SYSTEM WITH LOW COST

[75] Inventors: Christoph M. Ernecke; Michael Barten; Mustapha Toutaoui, all of Berlin, Germany

[73] Assignee: Otis Elevator Company, Farmington, Conn.

[21] Appl. No.: 18,485

[22] Filed: Feb. 16, 1993

[51] Int. Cl.$^6$ .............................................. B66B 13/14
[52] U.S. Cl. ..................................... 187/316; 388/842
[58] Field of Search ............... 187/103, 118, 119, 116, 187/115, 112; 388/842, 843, 844, 847, 804, 811, 814, 800

[56] References Cited

U.S. PATENT DOCUMENTS

| | | | |
|---|---|---|---|
| 3,614,571 | 10/1971 | Koch | 318/345 |
| 4,305,480 | 12/1981 | Hmelovsky | 187/103 |
| 4,967,128 | 10/1990 | Sawai et al. | 318/609 |
| 5,050,709 | 9/1991 | Okumura et al. | 187/116 |
| 5,131,506 | 6/1992 | Mizuno et al. | 187/103 |
| 5,223,778 | 6/1993 | Svarovsky et al. | 318/610 |

Primary Examiner—Kristine L. Peckman
Assistant Examiner—Robert Nappi

[57] ABSTRACT

The present invention solves the problem of discontinuous operation of an elevator door, depending upon the operating point of the door at the time of the reversal command, by a digital control technique which uses as a reference signal for the adaptation, the velocity dictation coming from a profile generator. This gives an information concerning the actual operating point. The adaptation of the controller parameters is made with respect to the signal.

2 Claims, 5 Drawing Sheets

R1: STATOR RESISTOR
R2: ROTOR RESISTOR
L1: STATOR INDUCTANCE
L2: ROTOR INDUCTANCE
Lh: MAIN INDUCTANCE
U1: STATOR VOLTAGE

ADAPTIVE DIGITAL VELOCITY CONTROL LOOP FOR A HIGH PERFORMANCE ELEVATOR DOOR SYSTEM WITH LOW COST

TECHNICAL FIELD

The present invention relates to adaptive digital control of an elevator door, the reversal thereof, and control of a voltage to frequency characteristic in response to motor slip.

BACKGROUND OF THE INVENTION

A cost effective method to control an elevator door system can be achieved by using a velocity closed loop control and a look-up table in a computer for variable frequency control of an AC motor. The door system is designed for high performance.

The low cost realization of such a door system is done with an eight-bit microprocessor. To achieve constant dynamics of the closed loop control in all the operating regions of the door systems, that is, normal opening/closing runs or reversal, the velocity controller is of the adaptive type. FIG. 1 shows the block diagram of the control system.

The normal run consists of a velocity profile for the full doorway. If the door movement should change from closing to opening or vice versa, the door has to be stopped first, and then it can change the run direction with another different profile designed for the corresponding short run. Stopping of a moving door and reversal of the direction of movement of the door is generally known in the elevator art as "reversal." The stopping must not show oscillations. FIG. 2 shows the different profiles resulting from the given door commands. Additionally, the variation of the controller or gain is given depending on the velocity profile.

The closed loop control should have the same dynamic behavior for the starting phase with each velocity profile, that is, the long profile run for the complete doorway or the short run, when reversal occurs. FIG. 3 shows the mechanical assembly of such a door. The needed force to start the door movement depends on the actual position of wheel A in FIG. 3.

Depending on the operating point, the non-linear characteristics of the mechanical assembly change when the performance changes. To assure good performance in all operating points, an adapted velocity control is necessary in order to track velocity dictation, especially when starting with opening/closing at low speed. Several techniques are known to control an AC motor like the field-oriented control. Generally, the relationship between a dictated stator frequency and reference stator voltage in a variable frequency induction motor drive is a ramp function until a point is reached at which an increase in dictated stator frequency yields the same reference stator voltage. The control system consists of a velocity control with an inner current control loop. In this case, a high performance microprocessor/controller or a digital signal processor (DSP) is necessary to fulfill the requirements. In addition, two current sensors are needed for the torque control. The realization of such a control system results in high cost.

DISCLOSURE OF THE INVENTION

An object of the invention is door velocity profiles that are substantially similar independent of the operating point of the door, especially the physical location of the door when a reversal occurs. Another object of the present invention is benefits similar to those of a vector control.

The present invention solves the problem of discontinuous operation of the door, depending upon the operating point of the door at the time of the reversal command, by a digital control technique which uses as a reference signal for the adaptation, the velocity dictation coming from a profile generator. This gives an information concerning the actual operating point. The adaptation of the velocity gain controller is made with respect to the velocity dictation. The advantage is that the shape of the velocity profile of the elevator door is basically the same whether the door is closing, opening or in reversal, and regardless of the horizontal position of the door when it is commanded to reverse.

In further accord with the present invention, voltage-frequency tables are calculated using a single phase equivalent circuit of an induction motor in steady state, as shown in FIG. 4. FIG. 5 shows the variation of the voltage depending on the stator frequency for different slippages. The advantage is that control of the induction motor is similar to that of a vector controlled induction motor without the use of a vector control.

The digital realization of the controller adaptation as described below will also avoid the drift problems of an analog door control techniques and allow easy change of door parameters.

BEST MODE FOR CARRYING OUT THE INVENTION

Figure 1:
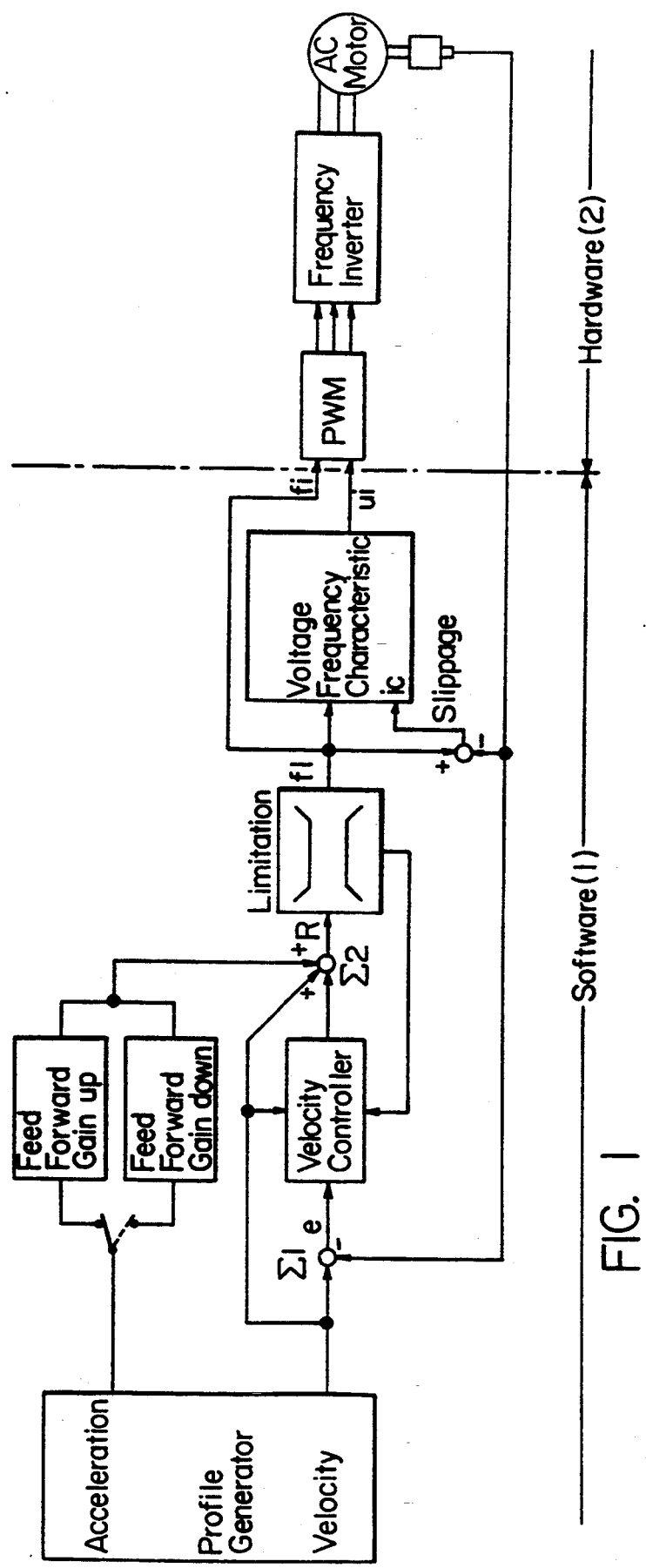
FIG. 1 shows a block diagram of an adaptive velocity control loop.
Figure 2A:
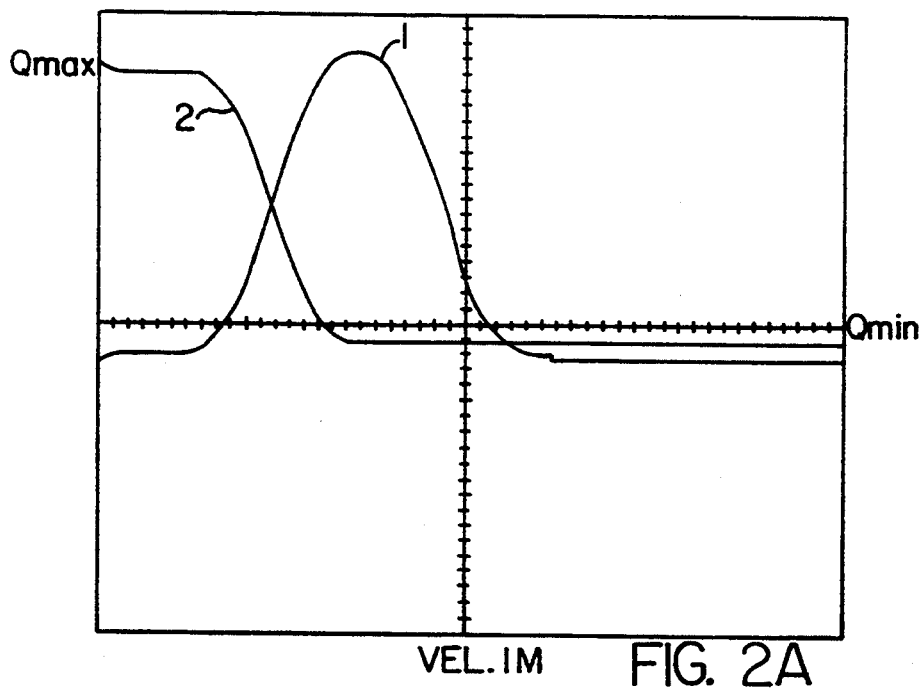
FIG. 2 shows the variation of the gain depending on the velocity profile.
Figure 2B:
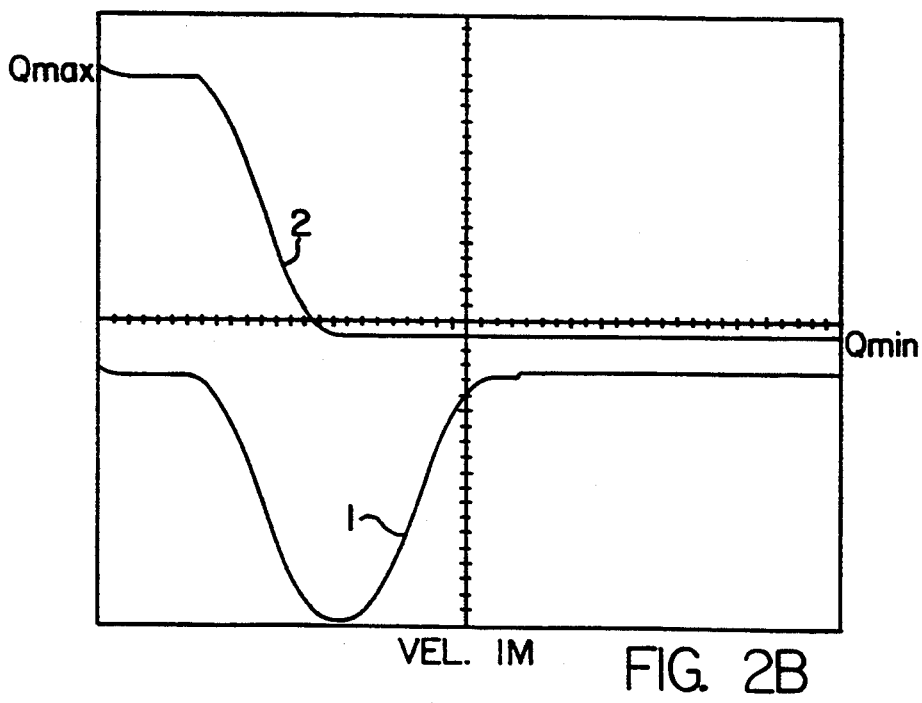
Figure 2C:
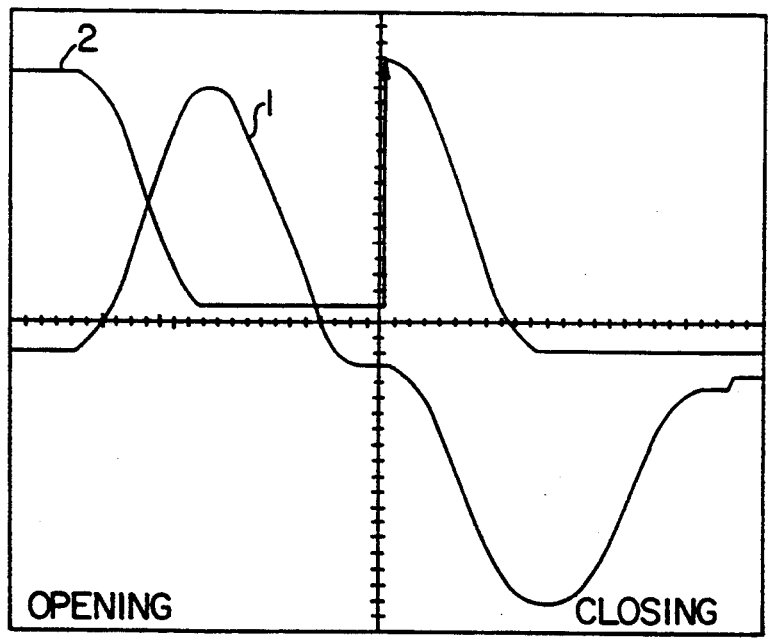
Figure 2D:
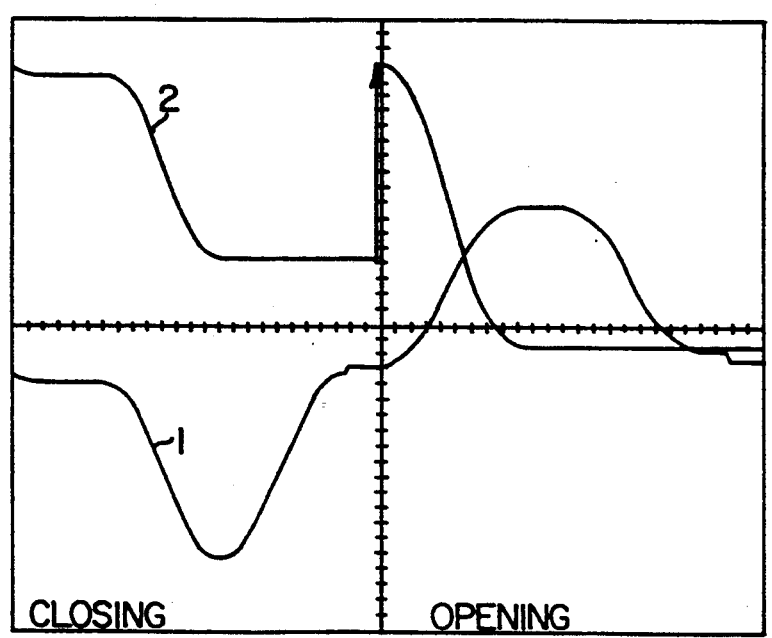
Figure 3:
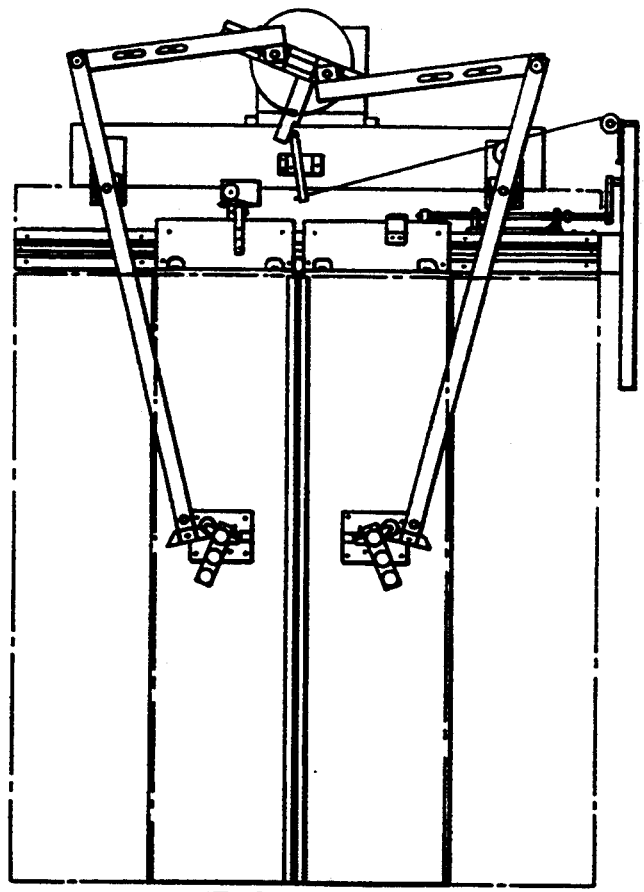
FIG. 3 shows the mechanical door assembly.

FIG. 1 shows the block diagram of an adaptive velocity control loop, consisting of a hardware part (2) and a software part (1).

The hardware part includes a chip which generates the pulse width modulation (PWM) signals and an inverter board which provides the needed current to drive the motor.

The control loop is implemented in software (1). The velocity controller compares the actual velocity with dictation and sets the appropriate stator frequency. Next, the summing point includes, in addition to the controller output, the velocity dictation coming from the profile generator and a feed-forward gain. In this case, the velocity controller gain could be reduced to a low value to avoid amplification of disturbance in the velocity feedback.

There are two feed-forward gain parameters (feed gain up, feed gain down). A selection from one to another is done automatically according to the acceleration or deceleration phase of the profile generator, to compensate the behavior changes of the induction motor. During the generating drive of the induction motor, the dynamic behavior is stiffer than during the motoring operation.

A limitation block affects the resultant signal R concerning the maximum level to protect the inverter board. To assure a correct function of the control loop, a wind-up limit signal is set by line 1 when the limit is reached. The integration part of the velocity controller is disabled in a way that the PI-controller can work as a P-controller.

The velocity controller used is a proportional-integral (PI) structure with the following frequency response.

$$Gr(s) = K0*(1+sT)/sT + K0 + K0/sT \quad \text{(Equation 1)}$$

where
$K0$ is the gain;
$T$ is the response; and
$s$ is the Laplace operator.

The digital implementation of the regulator, that is, the velocity controller, is done by using the following algorithm:

$$U(K) = U(K-1) + Q0*E(K) - Q1*E(K-1) \quad \text{(Equation 2)}$$

which is the digital form of the frequency response equation above.

In the above equation,
$U(K)$ is the controller output at the time instant $K*T0$;
$E(K)$ is the control error at the time instant $K*T0$;
$U(K-1)$ is the controller output at the previous time instant $(K-1)*T0$;
$E(K-1)$ is the control error at the previous time instant $K*T0$;
$Q0 = K0$;
$Q1 = K0*(1-T0/T)$;
$Q0, K0$ is the gain;
$T$ is the response;
$Q1$ is the digital response;
$T0$ is the sampling time (10 milliseconds).

The gain of the controller is adapted to the non-linear behavior of the mechanical door assembly by starting with a high value at a low range of the profile generator, and then finishing with a low value when the maximum velocity is reached. The last calculated gain will be maintained constant during the deceleration phase when the door is stopping.

Due to different profiles which are stored for the different doorways when a reversal occurs, a general function for the gain adaptation is calculated to fulfill the performance for all profiles. As many as sixteen different door profiles may be used.

The relationship between the gain and velocity profile is given as follows:

$$Q = Qmax - (Qmax - Qmin/Vmax)*V; \text{ or}$$

$$Q = Qmax - Fact*V;$$

$Q$ is the actual calculated gain;
$Qmax$ is the maximum gain at a low velocity;
$Qmin$ is the minimum gain at a high velocity;
$V$ is the dictated velocity;
$Vmax$ is the maximum dictated velocity.

$$Fact = (Q_{max} - Q_{min})V_{max}$$

FIG. 2 shows the variation of the gain depending on the velocity profile.

In order to reduce the calculated time for the gain during a sampling time, the part of the equation, that is, the factor Fact is calculated and stored from different profiles during the initialization of the system.

The voltage-frequency control block provides the appropriate value for the voltage according to the given frequency in the actual slippage. Several look-up tables are calculated in the computer (FIG. 5) during an initialization run by using a single phase equivalent circuit of an induction motor in steady state, as shown in FIG. 4.

Figure 4:
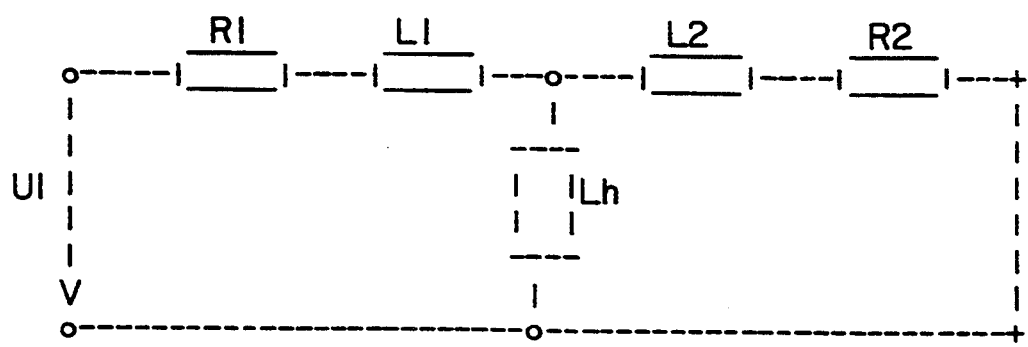
FIG. 4 shows an equivalent circuit of an induction motor in steady state.

FIG. 4 shows the equivalent circuit of a single-phase induction motor in steady state used to calculate the voltage-frequency characteristic.

The torque of an AC motor is a function of the flux and the slippage. It can be defined as follows:

$$Torque = K*flux*Fslip$$

$K$ is a scaling constant.

The flux is not a constant value. It depends on the stator frequency and the slippage. The flux can be affected by dictated stator voltage, that is, the flux can be held constant by adapting the stator voltage as a function of the slippage and the stator frequency.

Figure 5:
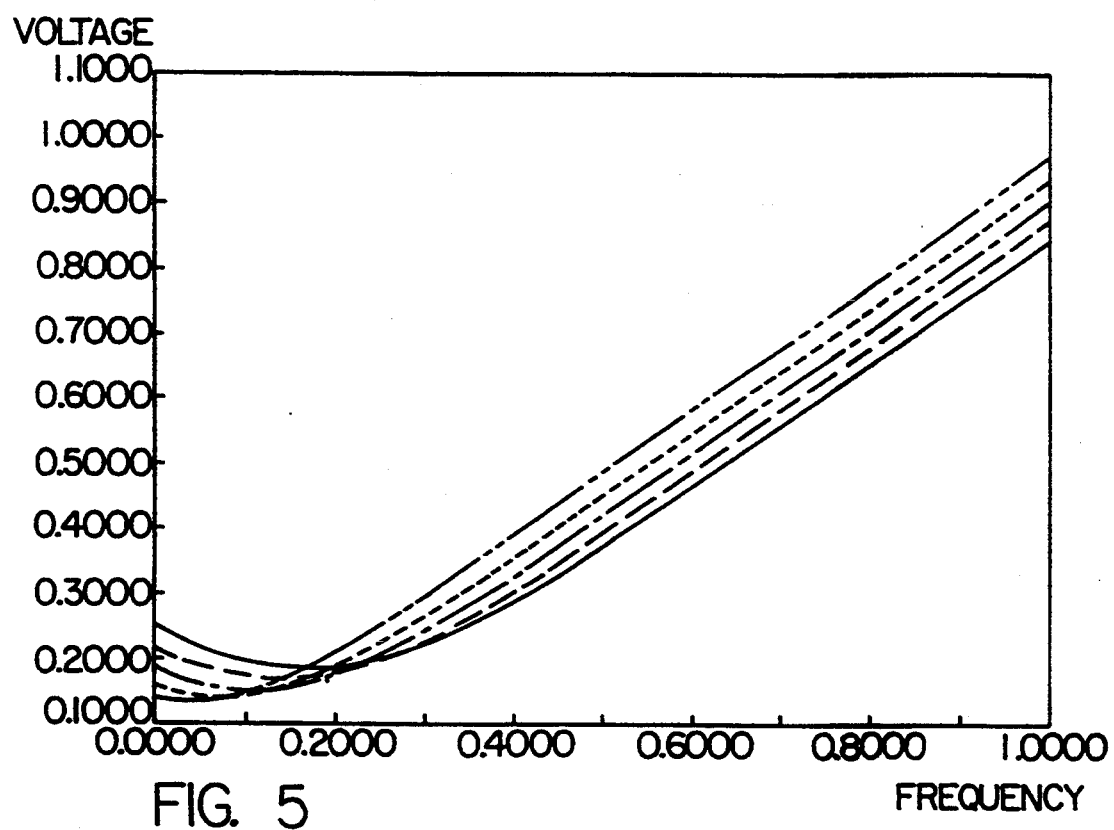
FIG. 5 shows the variation of the voltage depending on the stator frequency for different slippages.

To calculate the stator voltage, the following equation is used:

$$U_1 = flux*sqrt \text{ (numerator)/denominator where}$$

$$numerator = sqr[1+sqr(w2*T2)*sig] + sqr[w2*T2*(1-sig) + w1*T1*1 + sqr(w2*T2*sig))]$$

which is the function for the curve in FIG. 5.

$$Denominator = T1*(1 + sqr(w2*T2*sig)) \text{ where}$$

sqrt is the square root.
sqr is the square;
sig is the leakage factor;
T1 is a stator time constant;
T2 is a rotor time constant;
w1 is the stator frequency;
w2 is the slippage.

The leakage factor sig is discussed in detail at page 154 (see especially Equation 10.2) of *Control of Electrical Drives* by W. Leonhard, published by Springer-Verlag, 1985. The above explained method has shown good results during tests. By using an eight-bit microprocessor for this control loop, the costs for the realization of it are reduced considerably. Only a speed encoder is needed for the velocity control loop in comparison to other methods, where additionally two current sensors in one high performance microprocessor are required.

Various changes to the above description may be made without departing from the spirit and scope of the present invention as would be obvious to one of ordinary skill in the art of the present invention.

We claim:

1. An adaptive digital controller for controlling the motion of an elevator door, comprising:
   a profile generator, for providing a dictated door acceleration signal and a dictated velocity signal;
   gain means, for providing a feedforward gain including a gain up when the dictated door acceleration is positive and a gain down when the dictated door acceleration is negative, in response to said dictated acceleration signal;

a velocity sensing means responsive to rotation of an elevator door motor for providing an actual velocity signal;

a first summer responsive to said dictated velocity signal and said actual velocity signal for providing the difference between said velocities;

a velocity controller, responsive to said difference and responsive to the dictated velocity signal for providing a dictated stator frequency signal wherein the gain of said velocity controller is adapted to said dictated velocity signal;

a second summer responsive to said feedforward gain, said dictated velocity signal and said dictated stator frequency for providing a sum;

a frequency to voltage conversion means responsive to said sum for providing a reference stator voltage and a pulse width modulator responsive to said sum and said reference stator voltage for providing three-phase stator voltages; and an induction motor responsive to said three-phase stator voltages for moving said elevator door.

2. An elevator door system including an adaptive digital controller, comprising:

an elevator door drive containing an inverter and a motor;

a profile generator for providing a dictated velocity signal;

a velocity controller the gain of which is responsive to said dictated velocity signal for providing a dictated stator frequency signal to said elevator door drive, wherein the relationship between the gain and velocity is as follows:

$$Q = Q\text{max} - (Q\text{max} - Q\text{min})/V\text{max} * V$$

where
Q is the actual calculated gain of the velocity controller;
Qmax is the maximum velocity controller gain at a selectable velocity;
Qmin is the minimum gain of the velocity controller at a selectable high velocity;
V is the dictated velocity signal from said profile generator; and
Vmax is the maximum value of said dictated velocity signal provided from said profile generator.

* * * * *